United States Patent
Kim et al.

(10) Patent No.: US 8,111,301 B2
(45) Date of Patent: Feb. 7, 2012

(54) METHOD OF PERFORMING AUTO WHITE BALANCE IN YCBCR COLOR SPACE

(75) Inventors: Joo Hyun Kim, Gyunggi-do (KR); Bong Soon Kang, Busan (KR); Kyoung Soo Son, Busan (KR); Won Tae Choi, Gyunggi-do (KR); Boo Dong Kwak, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 932 days.

(21) Appl. No.: 12/123,900

(22) Filed: May 20, 2008

(65) Prior Publication Data

US 2009/0147099 A1    Jun. 11, 2009

(30) Foreign Application Priority Data

Dec. 7, 2007   (KR) .................. 10-2007-0126798

(51) Int. Cl.
*H04N 9/73* (2006.01)
*G06K 9/00* (2006.01)

(52) U.S. Cl. ..................... 348/223.1; 382/167
(58) Field of Classification Search ............... 348/223.1; 382/162–167
See application file for complete search history.

(56) References Cited

U.S. PATENT DOCUMENTS

| | | | |
|---|---|---|---|
| 5,481,302 A * | 1/1996 | Yamamoto et al. | 348/223.1 |
| 6,947,080 B2 * | 9/2005 | Ikeda | 348/223.1 |
| 7,333,138 B2 * | 2/2008 | Choi | 348/225.1 |
| 2002/0018129 A1 | 2/2002 | Ikeda | |
| 2008/0101690 A1 * | 5/2008 | Hsu et al. | 382/162 |
| 2010/0020192 A1 * | 1/2010 | Kim et al. | 348/223.1 |
| 2010/0259639 A1 * | 10/2010 | Hung et al. | 348/223.1 |

FOREIGN PATENT DOCUMENTS

JP          2002-27491 A         1/2002

\* cited by examiner

*Primary Examiner* — David Ometz
*Assistant Examiner* — Dillon Durnford Geszvain
(74) *Attorney, Agent, or Firm* — Lowe, Hauptman, Ham & Berner, LLP

(57) ABSTRACT

There is provided a method of performing auto white balance including: setting a plurality of sections of a whole range of a value of each of Y, Cb, and Cr in the YCbCr color space, according to a size of each value; calculating an accumulated Y, Cb, and Cr value of pixels included in each of the plurality of sections; determining effective sections according to the number of the pixels included in each of the plurality of sections; calculating a mean Y, Cb, and Cr value of pixels included in all of the effective sections by using the accumulated Y, Cb, and Cr value of each of the effective sections; calculating a mean RGB value by converting the mean Y, Cb, and Cr value into an RGB color space; and determining an RGB color gain of a Bayer image outputted from an image sensor by using the mean RGB value.

5 Claims, 4 Drawing Sheets

METHOD OF PERFORMING AUTO WHITE BALANCE IN YCBCR COLOR SPACE

CROSS-REFERENCE TO RELATED APPLICATIONS

This application claims the priority of Korean Patent Application No. 2007-0126798 filed on Dec. 7, 2007, in the Korean Intellectual Property Office, the disclosure of which is incorporated herein by reference.

BACKGROUND OF THE INVENTION

1. Field of the Invention

The present invention relates to an auto white balance method using processing a digital image, and more particularly, to an auto white balance method in a YCbCr color space, the method capable of executing a white balance of an image frame detected by an image sensor by calculating R and B color gains of the image sensor by using pixels of a particular section according to Y, Cb, and Cr values among inputted image frames expressed in the YCbCr color space.

2. Description of the Related Art

In general, though a peripheral lighting environment, that is, a light source is changed, eyes of a human always recognize white as it is. For example, a white color under a blue light source such as a fluorescent lamp, a white color under a white light source, and a white color under a red light source such as an incandescent lamp are recognized as the same to eyesight of a human.

However, in the case of image sensors, detected white colors vary with peripheral light sources. That is, since image sensors reproduce a reflected light of a given color temperature, a detected white color is changed. That is, light sources have a different color temperature from one another. For example, an object of white appears red under a light source with a low color temperature and appears blue under a light source with a high color temperature. To compensate a color difference occurring due to various light sources with a different color temperature, most of image apparatuses employing an image sensor, such as digital cameras and digital camcorders, perform a digital image processing process such as white balance.

Generally, the white balance may be performed by estimating a degree of a change caused by a light source from an image obtained from an image sensor and determining a gain for each color of the image sensor to compensate the change.

As conventional auto white balance methods, there are known a maximum RGB method of estimating white based on respective maximum red, green, and blue values from an image, a grayworld method of determining average RGB values of an inputted color image as a gray color and estimating a reference white color by using the gray color, and a method of estimating a reference white color by using a nerve network. As a representative method of compensating colors of an object by using conventional estimation methods, a method of expressing a distorted white object as accurate white by controlling a color gain that is a coefficient multiplied by color information, which is called as auto white balance. Ideally, in the case of an image processed with auto white balance, colors of an image, obtained by photographing the image under all light sources, should be identical to original colors.

However, in the case of the conventional auto white balance method, there are many cases that wrong color gains are calculated by estimating wrong white color when only a certain portion of an image is very bright or a lot of certain colors are distributed. Due to this, auto white balance is not accurately performed.

SUMMARY OF THE INVENTION

An aspect of the present invention provides a method of performing auto white balance in a YCbCr color space, the method capable of performing accurate auto white balance with respect to a single color image by using pixels showing a bright image, that is, an image with a high Y value, which greatly influences on visual reaction of a human.

An aspect of the present invention also provides a method of performing auto white balance in a YCbCr color space, the method capable of avoiding a sudden color change and smoothly changing a color by using an infinite impulse response (IIR) filter when applying color gains with respect to a red value and a blue value of an image sensor, calculated to perform the auto white balance.

According to an aspect of the present invention, there is provided a method of performing auto white balance in a YCbCr color space, the method including: setting a plurality of sections of a whole range of a value of each of Y, Cb, and Cr in the YCbCr color space, according to a size of each value; calculating an accumulated Y value, an accumulated Cb value, and an accumulated Cr value for each section of pixels of an input image frame, the pixels included in each of the plurality of sections; determining one or more effective sections including pixels to be used in the auto white balance among the plurality of sections, according to the number of the pixels included in each of the plurality of sections; calculating a mean Y value, a mean Cb value, and a mean Cr value of pixels included in all of the effective sections by using the accumulated Y value, the accumulated Cb value, and the accumulated Cr value of each of the effective sections; calculating a mean R value, a mean G value, and a mean B value by converting the mean Y value, the mean Cb value, and the mean Cr value into an RGB color space; and determining an R color gain and a B color gain of a Bayer image outputted from an image sensor by using the mean R value, the mean G value, and the mean B value.

The setting a plurality of sections may include: dividing the whole range of the Y value, with respect to the whole range of the Y, Cb, and Cr values in the YCbCr color space, into a plurality of areas having a predetermined range in an order of size; and determining the range of the Cb and Cr with respect to each of the areas of the Y value and determining the range of the Y, Cb, and Cr values with respect to the each section.

The determining the range of the Cb and Cr may include determining a wider range of the Cb and Cr values with respect to an area of the Y value, the area including a greater Y value.

The determining one or more effective sections may include determining a section in which an accumulated number of the pixels included in each section is a preset reference number of samples or more, sequentially from a section whose Y value is great, as the effective section.

The determining an R color gain and a B color gain may include determining the R color gain and the B color gain according to following Equation 1, $$R_{gain} = \frac{G_{mean}}{R_{mean}}, \quad B_{gain} = \frac{G_{mean}}{B_{mean}} \quad \text{where} \quad \text{Equation (1)}$$

$R_{gain}$ and $B_{gain}$ indicate the R color gain and the B color gain of the Bayer image outputted from the image sensor, respectively, $R_{mean}$ indicates the mean R value, $G_{mean}$ indicates the mean G value, and $B_{mean}$ indicates the mean B value.

The method may further include: applying an infinite impulse response (IIR) filter having plurality of time constants to the R color gain and the B color gain; and applying the R color gain and the B color gain, to which the IIR filter is applied, to the image sensor.

According to an exemplary embodiment of the present invention, auto white balance is performed by using pixels included in Cb and Cr with a different range from each other according to brightness, that is, Y components by using Y, Cb, and Cr data of an input image frame, thereby reducing an image distortion regardless that the input image frame has a single color or a plurality of pixels in a certain color area.

Also, since auto white balance is performed using a YCbCr value essentially calculated in digital image apparatuses such as digital cameras and digital camcorders, there is no required additional color space conversion to perform the auto white balance. Accordingly, it is possible to reduce additional hardware and software loads occurring while performing the auto white balance.

Also, color gains with respect to an R value and a B value of an image sensor, calculated to perform auto white balance are gradually applied using an IIR filter, instead of being directly applied to an image frame inputted thereafter. Accordingly, it is possible to prevent a sudden color change and to provide a natural image to a user.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
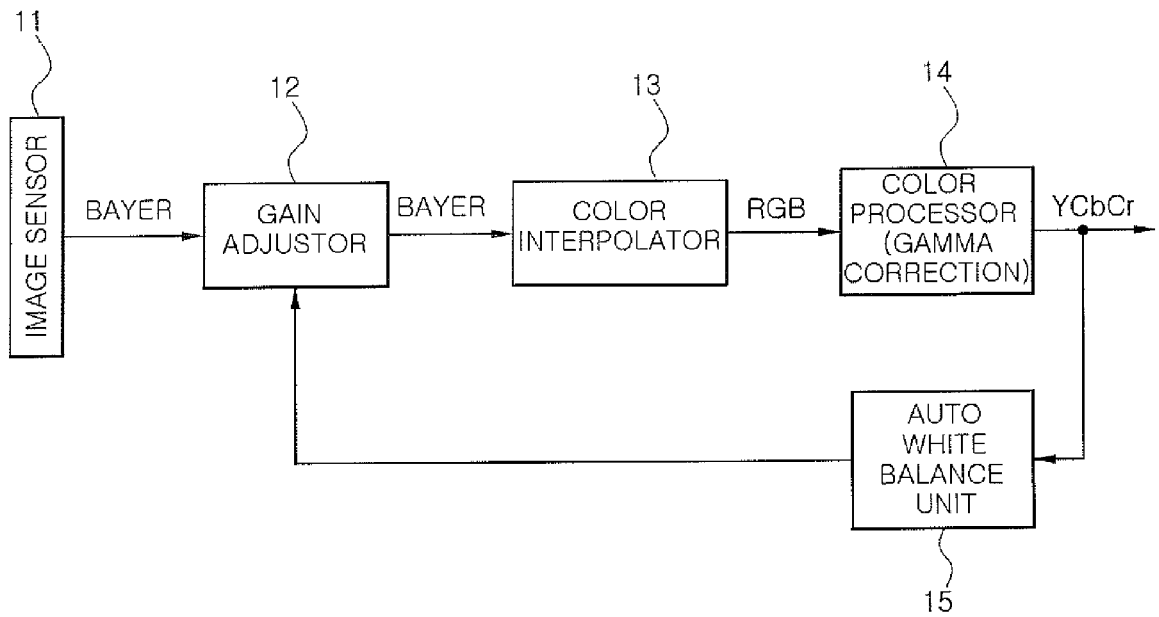
FIG. 1 is a block diagram illustrating a digital image apparatus to which the present invention is applied.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity.

FIG. 1 is a block diagram schematically illustrating a digital image apparatus to which the present invention may be applied.

Referring to FIG. 1, the digital image apparatus may include an image sensor 11 receiving light and converting the light into an electrical image signal, a gain adjustor 12 adjusting a gain of a certain color in an image signal outputted from the image sensor 11, a color interpolator 13 determining a red (R) value, a green (G) value, and a blue (B) value of each pixel included an image signal with an adjusted gain, and a color processor 14 adjusting a color of each pixel by performing gamma correction. The image signal outputted from the image sensor 11 is a Bayer pattern signal with each pixel showing a color value of one of R, G, and B. The gain adjusted at the gain adjustor 12 is applied to the R, G, and B values shown by each pixel of the Bayer pattern signal, thereby adjusting a color value thereof and determining the R, G, and B values with respect to the each pixel at the color interpolator 13. The each pixel of the image signal outputted from the color interpolator 13 is shown as the R, G, and B values. After color processing such as gamma correction is performed on the color of the each pixel by the color processor 14, the R, G, and B of the each pixel are converted into YCbCr values and outputted. That is, image processing performed after the color processor 14, such as outline emphasis and resolution improvement, are performed on the YCbCr value of the image. Such image processing process of the digital image apparatus corresponds to a general method commonly performed in most of digital image apparatuses.

The present invention may be performed by using a YCbCr value of an input image essentially generated in a general image processing process. That is, a method of performing auto white balance, according to an exemplary embodiment of the present invention, may be performed by an auto white balance unit 15 calculating color gains with respect to red and blue, for auto white balance, using a YCbCr value of an input image, generated at the color processor 14 and allowing the gain adjustor 12 to apply the color gains.

As described above, since the method of performing auto white balance is performed by using an image signal shown in a YCbCr space essentially generated in a general image processing process, there is no required an additional color space conversion process for auto white balance. Accordingly, it is possible to reduce additional hardware or software loads to convert a color space while performing the auto white balance.

Figure 2:
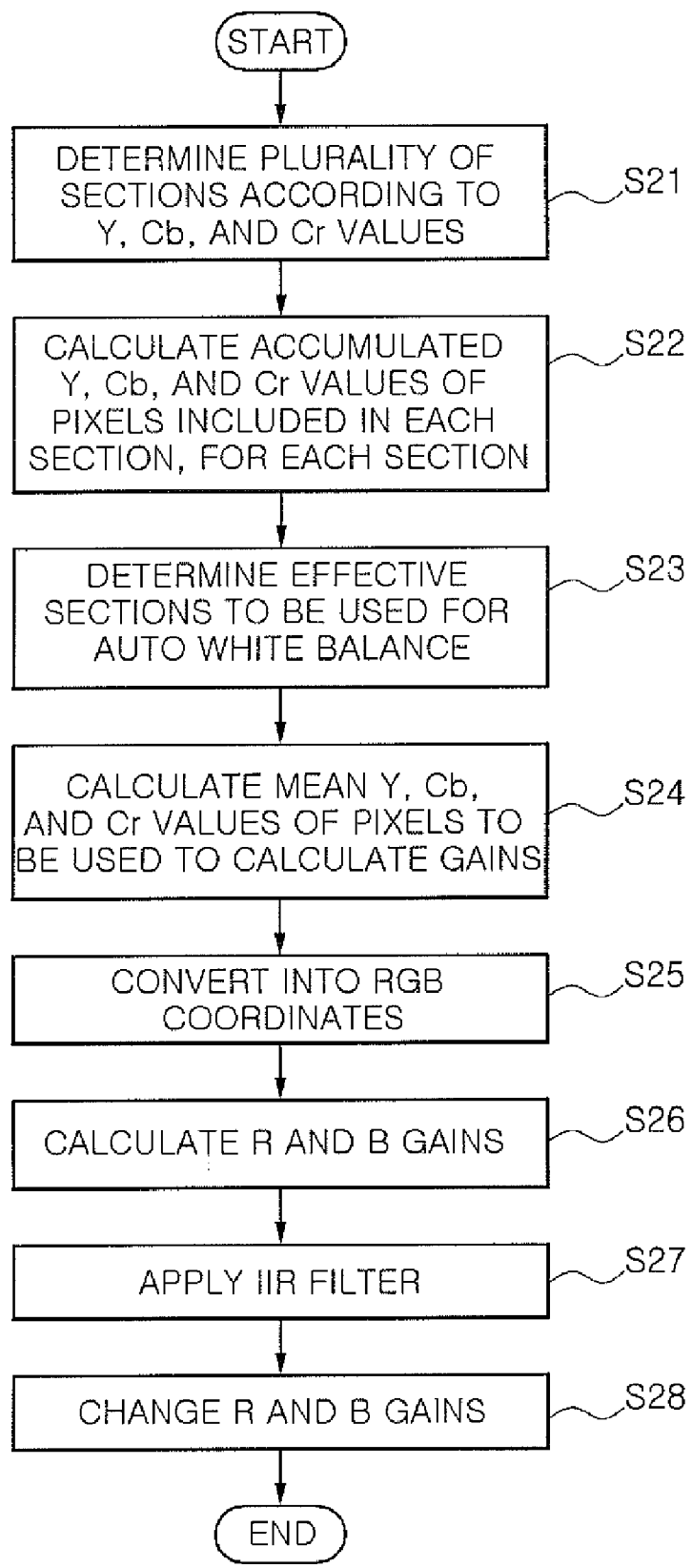
FIG. 2 is a flowchart illustrating a method of performing auto white balance in a YCbCr color space, according to an exemplary embodiment of the present invention.

FIG. 2 is a flowchart illustrating the method of performing auto white balance in a YCbCr color space, according to an exemplary embodiment of the present invention, which is the auto white balance method performed by the auto white balance unit 15 of FIG. 1.

Referring to FIG. 2, the auto white balance method may include: setting a plurality of sections of a whole range of a value of each of Y, Cb, and Cr in the YCbCr color space, according to a size of each value (S21); calculating an accumulated Y value, an accumulated Cb value, and an accumulated Cr value for each section of pixels of an input image frame, the pixels included in each of the plurality of sections (S22); determining one or more effective sections including pixels to be used in the auto white balance among the plurality of sections, according to the number of the pixels included in each of the plurality of sections (S23); calculating a mean Y value, a mean Cb value, and a mean Cr value of pixels included in all of the effective sections by using the accumulated Y value, the accumulated Cb value, and the accumulated Cr value of each of the effective sections (S24); calculating a mean R value, a mean G value, and a mean B value by converting the mean Y value, the mean Cb value, and the mean Cr value into an RGB color space (S25); and determining an R color gain and a B color gain of a Bayer image outputted from an image sensor by using the mean R value, the mean G value, and the mean B value (S26).

In addition, the auto white balance method may further include: applying an infinite impulse response (IIR) filter having plurality of time constants to the R color gain and the B color gain (S27); and applying the R color gain and the B color gain, to which the IIR filter is applied, to the image sensor (S28).

Hereinafter, the operation and effects of the auto white balance method according to an exemplary embodiment of the present invention will be described in detail.

Figure 3:
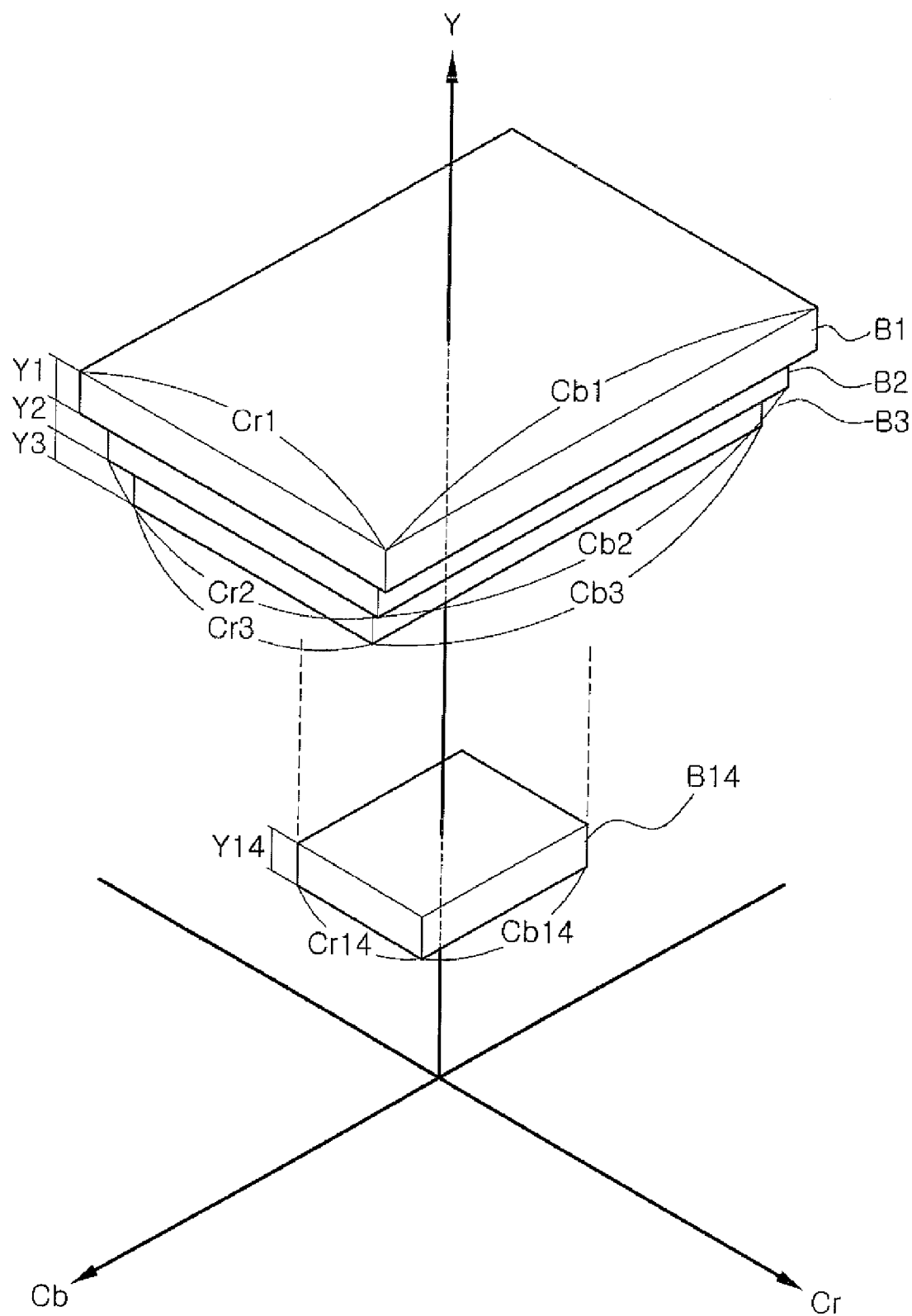
FIG. 3 is a diagram illustrating a section on YCbCr color section coordinates, the section set in an operation of setting a plurality of sections.

As described above, the auto white balance method according to an exemplary embodiment of the present invention starts with S21 in which a plurality of sections is set according to a size of each value of a whole range of Y, Cb, and Cr values in a YCbCr color space. FIG. 3 is a diagram illustrating the section set in S21, on YCbCr color space coordinates. FIG. 3 illustrates the sections B1 to B14, in which the present invention will be not be limited to the number of the sections shown in FIG. 3.

Referring to FIG. 3, S21 may start with dividing a whole range of a Y value in the YCbCr color space into a plurality of areas Y1 to Y14 having a predetermined range in an order of size. That is, to set the section, the Y value indicating brightness is divided into the plurality of areas Y1 to Y14. The division of the area of the Y value may be sequentially performed in the order of size, from a greatest value that the Y value may have.

After dividing the area of the Y value, with respect to each of the Y value areas Y1 to Y14, Cb ranges Cb1 to Cb14 and Cr ranges Cr1 to Cr14 are determined. When determining the Cb ranges Cb1 to Cb14 and the Cr ranges Cr1 to Cr14, a Y value including a greater Y value may have wider Cb and Cr ranges. The sections B1 to B14 are sections to determine a pixel on which white balance is performed, in an inputted image. As described above, when the section is set in such a way that an area of a Y value including a greater Y value has wider ranges of Cb and Cr values, white balance is performed on brighter pixels. For example, when a light source is a fluorescent lamp, a white image imaged by an image sensor includes blue. In this case, blue having an effect on bright white has a greater effect on a white point change amount of an entire image than blue having an effect on dark white. That is, according to an exemplary embodiment of the present invention, a distortion of white balance, occurring in an image of a single color may be reduced by allowing an influence of a pixel with low brightness, that is, with a small Y value, on white balance, to be reduced and an influence of a pixel with high brightness, that is, with a great Y value, on the white balance, to be relatively greater. Also, due to the setting the plurality of section, white balance without distortion may be performed by reducing an influence caused by a certain color area, on an image including a large amount of pixels in the certain color area.

As described above, when it is completed setting the sections defined as ranges of the Y value, the Cb value, and the Cr value, an accumulated Y value, an accumulated Cb value, and an accumulated Cr value for each section of pixels included in the section among pixels of an inputted image frame are calculated (S22). That is, in S22, Y values, Cb values, and Cr values of the pixels included in each section are accumulated and added, thereby calculating the accumulated Y value, the accumulated Cb value, and the accumulated Cr value for each section.

According to the number of the pixels included in the each section, one or more effective sections including pixels to be used for auto white balance are determined among the plurality of sections (S23). In S23, the effective section to be used in auto white balance is determined according to the number of the pixels included in the each section. The operation of S23 may be performed before S22.

In detail, in S23, the effective section may be determined sequentially, from a section with a great Y value, to a section with the number of accumulated pixels included in each section, greater than or identical to a preset reference sample number. The reference sample number may be determined as a percentage of a total number of pixels included in an inputted image. Expressing this in an equation, when a section number from first is given to all of the plurality of section, in an order of size of the Y value, a least n satisfying following Equation 2 is determined and a first section to nth section may be determined as the effective sections.

Number of pixels accumulated by nth section≧reference sample number  Equation (2)

For example, when a reference sample number is set as 5% of a total pixel number of an inputted image, a pixel number accumulated by a third section is less than 5%, and a pixel number accumulated by a fourth section is more than 5%, first to four sections are determined to be effective sections. Pixels included in the first to fourth sections may be used to calculate gains for auto white balance. On the other hand, when a sample number accumulated by a last section, that is, a number of pixels included in all sections, is smaller than the reference sample number, all pixels included in the all sections may be determined to be used for a white balance operation.

In S24, a mean Y value, a mean Cb value, and a mean Cr value of the pixels included in all of the effective sections are calculated by using an accumulated Y value, an accumulated Cb value, and an accumulated Cr value for each effective section. The accumulated Y value, the accumulated Cb value, and the accumulated Cr value calculated in S22 are added together for each effective section determined in S23 and a value obtained by the addition is divided by the number of the pixels included in all of the effective sections, thereby obtaining the mean Y value, the mean Cb value, and the mean Cr value.

In 25, a mean R value, a mean G value, and a mean B value are calculated by converting the mean Y value, the mean Cb value, and the mean Cr value into RGB color spaces. Since a method of converting an image shown as a YCbCr color space into an image shown as an RGB color space is well-known to those skilled in the art, a detailed description thereof will be omitted. The mean R value, the mean G value, and the mean B value, which are obtained in S25, indicate color inclination of a present input image frame, that is, a change amount of a white point of the present input image frame. It is possible to operate a color gain capable of solving the color inclination by using the mean values.

On the other hand, a sequence between S24 of calculating the mean Y value, the mean Cb value, and the mean Cr value and the S25 of calculating the mean R value, the mean G value, and the mean B value may be changed. That is, the accumulated Y value, the accumulated Cb value, and the accumulated Cr value, which are obtained in S22, are added together, respectively, the value obtained by the addition is converted into the RGB color space, and a converted addition value is divided into the number of the pixels included in the effective sections, thereby calculating the mean R value, the mean G value, and the mean B value.

In 26, an R color gain and a B color gain of an image sensor applied to the white balance are determined by using the mean R value, the mean G value, and the mean B value.

When an R value, a G value, and a B value of a image are identical to one another, the image becomes one of gray levels, which do not include any color. As described above, rates of the mean RGB values indicate that an input image is inclined to a corresponding color as the rate. A white balance process for compensating by the rate is required. Accordingly, when multiplying the input image by a reciprocal of the rate, it is possible to perform the white balance. For this, the reciprocal of the rate to perform the white balance may be determined to be the color gain for the white balance. To calculate the color gain, mean R value and the mean B value are normalized based on the mean G value and the reciprocal is determined to be the color gain for the white balance of the input image. That is, the color gain may be obtained by following Equation 1, $$R_{gain} = \frac{G_{mean}}{R_{mean}}, B_{gain} = \frac{G_{mean}}{B_{mean}} \qquad \text{Equation (1)}$$

where $R_{gain}$ and $B_{gain}$ indicate the R color gain and the B color gain of the image sensor, respectively, $R_{mean}$ indicates the mean R value, $G_{mean}$ indicates the mean G value, and $B_{mean}$ indicates the mean B value.

The color gain calculated according to Equation 1 is inputted to the gain adjustor 12 shown in FIG. 1. The gain adjustor 12 applies the color gains as gains for R and B from a Bayer image of a next image frame inputted from the image sensor, thereby performing the white balance.

On the other hand, the auto white balance method according to an exemplary embodiment of the present invention may include, before directly applying the color gains calculated in S26 to the Bayer image outputted from the image sensor, S27 of applying an infinite impulse response (IIR) filter having a plurality of time constants to the R color gain and the B color gain. When directly applying the color gains calculated in S26 to the next image frame, a sudden color change occurs and a user may sense unnaturalness from continuously displayed images. To avoid the sudden color change, in the present invention, the IIR filter is applied to the color gains calculated in S26 to control a speed of applying the auto white balance. A transfer function of the IIR filter may be shown as following Equation 3, $$H(z) = \frac{b_0}{1 - a_0 Z^{-1}}. \qquad \text{Equation (3)}$$

The IIR filter having the plurality of time constants is constructed by controlling $a_0$ and $b_0$, thereby varying the speed of applying the auto white balance.

Figure 4:
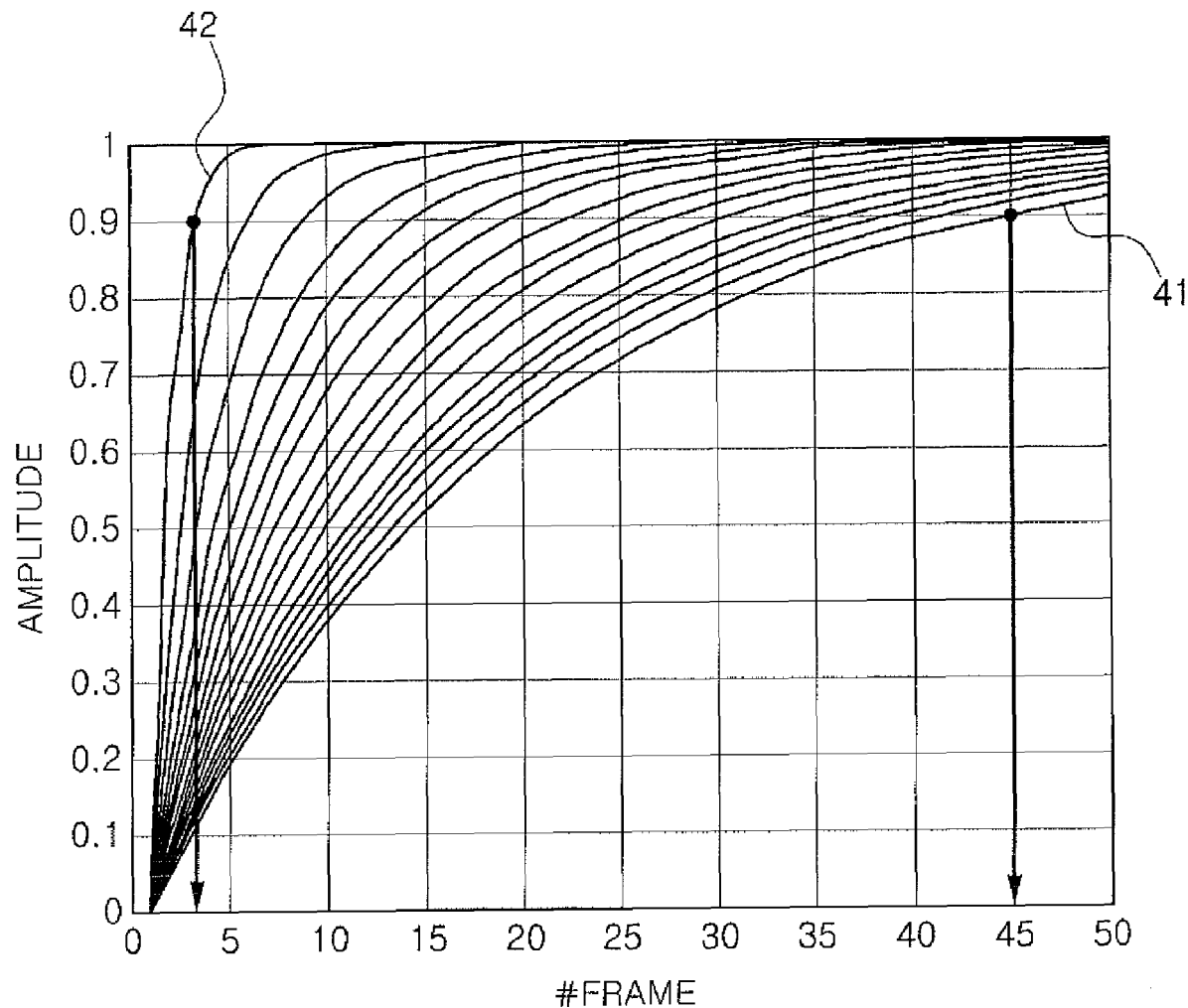
FIG. 4 is a graph illustrating an application of an infinite impulse response (IIR) filter according to an exemplary embodiment of the present invention.

FIG. 4 is a graph illustrating an application of the IIR filter according to an exemplary embodiment of the present invention. That is, FIG. 4 illustrates an application example of the IIR filter showing 16 different time constants by adjusting values of $a_0$ and $b_0$. For example, in FIG. 4, in the case of an IIR filter showing a time constant shown as a reference numeral 41, an amount of time to update an input value to an output value, that is, an amount of time to apply an R color gain and a B color gain calculated from a present input image frame, which is an amount of time of changing into approximate 90% of the input value, may be determined as after 45 frames. Also, in FIG. 4, in the case of an IIR filter showing a time constant shown as a reference numeral 42, an amount of time to update an input value to an output value may be determined as after 3 frames.

As described above, after the IIR filter with an adjusted time constant is applied to the R color gain and the B color gain, the color gain to which the IIR filter is applied is transferred to the gain adjustor 12 of FIG. 1. Via the gain adjustor 12, the color gain to which the IIR filter is applied is applied to a frame next to an image frame used for an color gain operation for white balance, thereby gradually performing auto white balance.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of performing auto white balance in a YCbCr color space, the method comprising:

setting a plurality of sections of a whole range of a value of each of Y, Cb, and Cr in the YCbCr color space, according to a size of each value;

calculating an accumulated Y value, an accumulated Cb value, and an accumulated Cr value for each section of pixels of an input image frame, the pixels included in each of the plurality of sections;

determining one or more effective sections including pixels to be used in the auto white balance among the plurality of sections, according to the number of the pixels included in each of the plurality of sections;

calculating a mean Y value, a mean Cb value, and a mean Cr value of pixels included in all of the effective sections by using the accumulated Y value, the accumulated Cb value, and the accumulated Cr value of each of the effective sections;

calculating a mean R value, a mean G value, and a mean B value by converting the mean Y value, the mean Cb value, and the mean Cr value into an RGB color space;

determining an R color gain and a B color gain of a Bayer image outputted from an image sensor by using the mean R value, the mean G value, and the mean B value, applying an IIR (Infinite Impulse Response) filter having plurality of time constants to the R color gain and the B color gain; and applying the R color gain and the B color gain, to which the IIR filter is applied, to the image sensor.

2. The method of claim 1, wherein the setting a plurality of sections comprises:

dividing the whole range of the Y value, with respect to the whole range of the Y, Cb, and Cr values in the YCbCr color space, into a plurality of areas having a predetermined range in an order of size; and determining the range of the Cb and Cr with respect to each of the areas of the Y value and determining the range of the Y, Cb, and Cr values with respect to the each section.

3. The method of claim 2, wherein the determining the range of the Cb and Cr comprises determining a wider range of the Cb and Cr values with respect to an area of the Y value, the area including a greater Y value.

4. The method of claim 1, wherein the determining one or more effective sections comprises determining a section in which an accumulated number of the pixels included in each section is a preset reference number of samples or more, sequentially from a section whose Y value is great, as the effective section.

5. The method of claim 1, wherein the determining an R color gain and a B color gain comprises determining the R color gain and the B color gain according to following Equation 1, $$R_{gain} = \frac{G_{mean}}{R_{mean}}, B_{gain} = \frac{G_{mean}}{B_{mean}} \quad \text{Equation (1)}$$

where $R_{gain}$ and $B_{gain}$ indicate the R color gain and the B color gain of the Bayer image outputted from the image sensor, respectively, $R_{mean}$ indicates the mean R value, $G_{mean}$ indicates the mean G value, and $B_{mean}$ indicates the mean B value.

\* \* \* \* \*